(12) United States Patent
Otsuka et al.

(10) Patent No.: US 6,716,403 B2
(45) Date of Patent: Apr. 6, 2004

(54) METHOD OF RECOVERING A CLEANING AGENT

(75) Inventors: Kenji Otsuka, Kanagawa (JP); Takashi Shimada, Kanagawa (JP); Minoru Osugi, Kanagawa (JP); Kei Kawaguchi, Kanagawa (JP)

(73) Assignee: Japan Pionics Co., Ltd., Tokyo (JP)

( * ) Notice: Subject to any disclaimer, the term of this patent is extended or adjusted under 35 U.S.C. 154(b) by 313 days.

(21) Appl. No.: 09/986,606

(22) Filed: Nov. 9, 2001

(65) Prior Publication Data

US 2002/0084220 A1 Jul. 4, 2002

(30) Foreign Application Priority Data

Nov. 14, 2000 (JP) .......................... 2000-346372
May 31, 2001 (JP) .......................... 2001-163665

(51) Int. Cl.$^7$ .................................. C01G 3/00
(52) U.S. Cl. ............................ 423/34; 423/35
(58) Field of Search .................. 423/34, 35, 210; 502/24

(56) References Cited

U.S. PATENT DOCUMENTS 4,786,621 A    11/1988  Holzhauer et al.
4,910,001 A     3/1990  Kitahara et al.

FOREIGN PATENT DOCUMENTS

| DE | 37 29 913 | 3/1989 |
| EP | 0 429 053 | 5/1991 |
| FR | 2 194 789 | 3/1974 |
| WO | 89/02481  | * 3/1989 |

OTHER PUBLICATIONS

European Search Report mailed Jan. 30, 2003, for No. EP 01 12 6085.
Patent Abstracts of Japan, Publication No. 02–290253, dated Nov. 30, 1990.
Abstract of SU 770,522—Database WPI, Section Ch, Week 198125, Derwent Publications Ltd., London GB, Oct. 15, 1980.
Abstract of SU 882,595—Database WPI, Section Ch, Week 198237, Derwent Publications Ltd., London GB, Nov. 23, 1981.
Abstract of JP 70–60121—Database WPI, Section Ch, Week 199518, Derwent Publications Ltd., London GB, Mar. 7, 1995.
Abstract of SU 379,661—Database WPI, Section Ch, Week 197352, Derwent Publications Ltd., London GB, Apr. 20, 1973.
Abstract of JP 05–123575—Database WPI, Section Ch, Week 199325, Derwent Publications Ltd., London GB; AN 1993–199878, May 21, 1993.

* cited by examiner

Primary Examiner—Steven Bos
(74) Attorney, Agent, or Firm—Antonelli, Terry, Stout & Kraus, LLP

(57) ABSTRACT

The invention provides a method of recovering a copper component or a manganese component from a cleaning agent containing copper oxide, a cleaning agent containing basic copper carbonate, a cleaning agent containing copper hydroxide, or a cleaning agent containing copper oxide and manganese oxide, the cleaning agents having been used for removing, through contact with a harmful gas, a phosphine contained as a harmful component in the harmful gas. Also, the invention provides a method of recovering a copper component or a manganese component from a cleaning agent containing basic copper carbonate, a cleaning agent containing copper hydroxide, or a cleaning agent containing copper oxide and manganese oxide, the cleaning agents having been used for removing, through contact with a harmful gas, a phosphine contained as a harmful component in the harmful gas. According to the present invention, the copper component and/or the manganese component can be effectively recovered from the cleaning agents in a recyclable form.

9 Claims, No Drawings

METHOD OF RECOVERING A CLEANING AGENT

BACKGROUND OF THE INVENTION

1. Field of the Invention

The present invention relates to a method of recovering a cleaning agent containing copper oxide as a component thereof, a cleaning agent containing basic copper carbonate as a component thereof, a cleaning agent containing copper hydroxide as a component thereof, or a cleaning agent containing copper oxide and manganese oxide as components thereof. More particularly, the invention relates to a method of recovering a copper component and/or a manganese component from a cleaning agent that has been used for removing a phosphine or a silane gas contained in a discharge gas from a semiconductor production step or a similar step.

2. Background Art

In the production steps for silicon semiconductors, compound semiconductors, etc., phosphines and hydrides (gaseous form) such as silane and disilane are employed as source gas or doping gas. Dichlorosilane is used as a source for forming silicon nitride ($Si_3N_4$) film on a semiconductor substrate such as a silicon wafer. These gases are highly harmful, and adversely affect the human body and environment if discharged to the atmosphere without any treatment. Therefore, the gases which contain these compounds and have been used in the semiconductor production steps must be cleaned prior to discharge to the atmosphere. In order to perform cleaning, there have conventionally been developed cleaning agents for harmful gases containing as a harmful component a phosphine, a silane, a disilane, or a dichlorosilane gas.

Regarding a method of cleaning a harmful gas containing a phosphine or a silane gas, the present applicant has developed a number of cleaning methods employing a cleaning agent containing copper oxide, or copper oxide and manganese oxide. According to one such cleaning method, a harmful gas containing a hydride gas such as phosphine is cleaned through contact with a cleaning agent formed of cupric oxide and an oxide of silicon and/or aluminum (Japanese Patent Application Laid-Open (kokai) No. 61-129026). Japanese Patent Application Laid-Open (kokai) Nos. 62-286521 to -286525 disclose methods of cleaning a similar harmful gas through contact with a cleaning agent formed of cupric oxide and an oxide of titanium, zirconium, lanthanum, iron, cobalt, nickel, tin, lead, antimony, bismuth, vanadium, molybdenum, tungsten, niobium, or tantalum.

Japanese Patent Application Laid-Open (kokai) No. 1-254230 discloses a method of cleaning a harmful gas containing arsine, silane, etc. by bringing the gas into contact with a cleaning agent formed of a composition containing manganese dioxide, copper oxide, and cobalt oxide serving as predominant components and a silver compound. Japanese Patent Application Laid-Open (kokai) No. 6-154535 discloses a method of cleaning a similar gas through contact with a cleaning agent formed of a composition containing manganese dioxide and copper oxide serving as predominant components and a potassium component, onto which composition a silver compound is adsorbed.

Cleaning agents containing other copper compounds include a gas treatment agent for treating a discharge gas containing a Group V inorganic compound discharged from a production step for a Group III–V compound semiconductor thin film, which agent comprises a copper compound such as basic copper carbonate (disclosed in Japanese Patent Application Laid-Open (kokai) No. 8-59391); a gas treatment agent for treating a discharge gas containing a Group V organic compound and a Group V inorganic compound discharged from production step for a Group III–V compound semiconductor thin film, which agent is prepared by mixing basic copper carbonate and potassium permanganate with anatase titanium oxide microparticles (disclosed in Japanese Patent Application Laid-Open (kokai) No. 8-155258); and a solid removing agent for removing, in a dry process, harmful components contained in a discharge gas such as volatile inorganic hydrides and halides, which agent contains crystalline cupric hydroxide as a predominant reaction component (disclosed in Japanese Patent Application Laid-Open (kokai) No. 6-319945).

Concerning copper compounds, manganese compounds, etc. which serve as components of the aforementioned cleaning agents, those assuming the form of uniform microparticles and having a high BET specific surface area have heretofore been developed. Methods of producing copper oxide of such a type are known; for example, Japanese Patent Application Laid-Open (kokai) No. 2-145422 discloses a method of preparing copper oxide microparticles of such a type comprising adding a neutralizing agent formed of an ammonium salt to a high-purity copper nitrate solution, to thereby form microparticles; and washing, drying, and calcining the thus-formed microparticles. Methods of producing manganese dioxide of such a type include a method comprising mixing a dilute aqueous solution of potassium permanganate, a dilute aqueous solution of manganese sulfate, and concentrated sulfuric acid by stirring under heating so as to form precipitates, and washing and drying the precipitates, to thereby prepare manganese dioxide of large specific surface area. In recent years, through improvement in the shape of copper oxide, manganese oxide, etc. which serve as components of a cleaning agent in an attempt to obtain excellent characteristics as well as through development of compositions of the cleaning agent as described above, cleaning agents of more excellent cleaning power (i.e., performance in cleaning a harmful component per unit amount of cleaning agent) have been produced.

After the aforementioned cleaning agents containing copper oxide as a component thereof, those containing basic copper carbonate as a component thereof, those containing copper hydroxide as a component thereof, or those containing copper oxide and manganese oxide as components thereof have been used for cleaning a gas containing a phosphine or a silane gas, the cleaning agents are deactivated through immersion in water or through a similar method to a safe level where the human body and the environment are not adversely affected, and are subsequently treated as industrial wastes. If a copper component and a manganese component can be recovered from the industrial wastes and recycled as components of a cleaning agent for a harmful gas, not only effective use of resources but also protection of the environment could be attained.

However, nothing has been elucidated about the state of used cleaning agents which have sorbed a harmful component. In addition, studies have never been conducted on, for example, reactivity of a cleaning agent which has sorbed a harmful component or on possibility of generation of a harmful gas during dissolution in acid or neutralization of the cleaning agent. Thus, there has never been developed a method of recovering a copper component and/or a manganese component from a used cleaning agent and of restoring activity of the components so as to make them reusable.

SUMMARY OF THE INVENTION

The present inventors have carried out extensive studies in order to solve the aforementioned problems, and have found that by dissolving, in an acidic solution such as sulfuric acid or nitric acid, a cleaning agent containing copper oxide, a cleaning agent containing basic copper carbonate, a cleaning agent containing copper hydroxide, or a cleaning agent containing copper oxide and manganese oxide, the cleaning agents having been used for cleaning a harmful gas containing a phosphine as a harmful component, a copper component or a manganese component can be readily separated from a phosphorus component which has been sorbed in the cleaning agent during the course of cleaning the harmful gas. The inventors have also found that, by dissolving, in an acidic solution such as sulfuric acid or nitric acid, a cleaning agent containing basic copper carbonate, a cleaning agent containing copper hydroxide, or a cleaning agent containing copper oxide and manganese oxide, the cleaning agents having been used for cleaning a harmful gas containing a silane gas as a harmful component, a copper component or a manganese component can be readily separated from a silicon component which has been sorbed in the cleaning agent during the course of cleaning the harmful gas. The present invention has been accomplished on the basis of these findings.

Thus, an object of the present invention is to provide a method of effectively recovering a copper component or a manganese component, in a recyclable form, from a cleaning agent containing copper oxide, a cleaning agent containing basic copper carbonate, a cleaning agent containing copper hydroxide, or a cleaning agent containing copper oxide and manganese oxide which has been used for removing a phosphine or a silane gas contained in a discharge gas produced during the course of a semiconductor production step or a similar step.

Accordingly, the present invention provides a method of recovering a cleaning agent, the cleaning agent having been used for removing, through contact with a harmful gas, a phosphine contained as a harmful component in the harmful gas, and being at least one species selected from among a cleaning agent containing copper oxide as a component thereof, a cleaning agent containing basic copper carbonate as a component thereof, and a cleaning agent containing copper hydroxide as a component thereof, the method comprising:

immersing the cleaning agent in an acidic solution, to thereby dissolve the cleaning agent;

adding to the resultant solution a precipitant for copper, to thereby cause a copper compound to precipitate;

separating a copper component from a phosphorus component which has been sorbed in the cleaning agent during the course of cleaning the harmful gas; and recovering the copper component of the cleaning agent.

The present invention also provides a method of recovering a cleaning agent, the cleaning agent having been used for removing, through contact with a harmful gas, a phosphine contained as a harmful component in the harmful gas, and being at least one species selected from among a cleaning agent containing copper oxide as a component thereof, a cleaning agent containing basic copper carbonate as a component thereof, and a cleaning agent containing copper hydroxide as a component thereof, the method comprising:

immersing the cleaning agent in an acidic solution, to thereby dissolve the cleaning agent;

adding to the resultant solution a precipitant for phosphorus, to thereby cause a phosphorus compound to precipitate;

separating a phosphorus component which has been sorbed in the cleaning agent during the course of cleaning the harmful gas from a copper component;

adding a precipitant for copper to the solution from which the phosphorus component has been removed, to thereby cause a copper compound to precipitate; and recovering the copper component of the cleaning agent.

The present invention also provides a method of recovering a cleaning agent, the cleaning agent having been used for removing, through contact with a harmful gas, a silane gas contained as a harmful component in the harmful gas, and being at least one species selected from a cleaning agent containing basic copper carbonate as a component thereof and a cleaning agent containing copper hydroxide as a component thereof, the method comprising:

immersing the cleaning agent in an acidic solution, to thereby transform a copper component to a soluble copper salt and cause a silicon component to precipitate in the form of silicon oxide, the silicon component having been sorbed in the cleaning agent during the course of cleaning the harmful gas;

separating the silicon component from the copper component;

adding a precipitant for copper to the solution from which the silicon component has been removed, to thereby cause a copper compound to precipitate; and recovering the copper component of the cleaning agent.

The present invention also provides a method of recovering a cleaning agent, the cleaning agent having been used for removing, through contact with a harmful gas, a phosphine contained as a harmful component in the harmful gas, and containing copper oxide and manganese oxide as components thereof, the method comprising:

immersing the cleaning agent in an acidic solution, to thereby dissolve the cleaning agent;

adding to the resultant solution a precipitant for copper and manganese, to thereby cause a copper compound and a manganese compound to precipitate;

separating a copper component and a manganese component from a phosphorus component which has been sorbed in the cleaning agent during the course of cleaning the harmful gas; and recovering the copper component and the manganese component of the cleaning agent.

The present invention also provides a method of recovering a cleaning agent, the cleaning agent having been used for removing, through contact with a harmful gas, a phosphine contained as a harmful component in the harmful gas, and containing copper oxide and manganese oxide as components thereof, the method comprising:

immersing the cleaning agent in an acidic solution, to thereby dissolve the cleaning agent;

adding to the resultant solution a precipitant for phosphorus, to thereby cause a phosphorus compound to precipitate;

separating a phosphorus component which has been sorbed in the cleaning agent during the course of cleaning the harmful gas, from a copper component and a manganese component;

adding a precipitant for copper and manganese to the solution from which the phosphorus component has been removed, to thereby cause a copper compound and a manganese compound to precipitate; and recovering the copper component and the manganese component of the cleaning agent.

The present invention also provides a method of recovering a cleaning agent, the cleaning agent having been used for removing, through contact with a harmful gas, a silane gas contained as a harmful component in the harmful gas, and containing copper oxide and manganese oxide as components thereof, the method comprising:

immersing the cleaning agent in an acidic solution, to thereby transform a copper component and a manganese component to a soluble copper salt and a soluble manganese salt, respectively, and cause a silicon component to precipitate in the form of silicon oxide, the silicon component having been sorbed in the cleaning agent during the course of cleaning the harmful gas;

separating the silicon component from the copper component and the manganese component;

adding a precipitant for copper and manganese to the solution from which the silicon component has been removed, to thereby cause a copper compound and a manganese compound to precipitate; and recovering the copper component and the manganese compound of the cleaning agent.

Numerous modifications and variations of the present invention are possible in light of the spirit of the present invention, and are not to be excluded from the scope of the present invention.

DETAILED DESCRIPTION OF PREFERRED EMBODIMENTS

The method of the present invention for recovering a cleaning agent is applied to a method of recovering a copper component and/or a manganese component from a cleaning agent containing copper oxide, a cleaning agent containing basic copper carbonate, a cleaning agent containing copper hydroxide, or a cleaning agent containing copper oxide and manganese oxide, the cleaning agents having been used for removing, through contact with a harmful gas, a phosphine contained as a harmful component in the harmful gas. The method of the present invention for recovering a cleaning agent is also applied to a method of recovering a copper component or a manganese component from a cleaning agent containing basic copper carbonate, a cleaning agent containing copper hydroxide, or a cleaning agent containing copper oxide and manganese oxide, the cleaning agents having been used for removing, through contact with a harmful gas, a silane gas contained as a harmful component in the harmful gas.

The method of the present invention is drawn to a method of recovering a cleaning agent, the cleaning agent having been used for removing, through contact with a harmful gas, a phosphine contained as a harmful component in the harmful gas, and being a cleaning agent containing copper oxide as a component thereof, a cleaning agent containing basic copper carbonate as a component thereof, or a cleaning agent containing copper hydroxide as a component thereof, the method comprising: immersing the cleaning agent in As an acidic solution, to thereby dissolve the cleaning agent; adding to the resultant solution a precipitant for copper or a precipitant for phosphorus, to thereby cause a copper compound or a phosphorus compound to precipitate; separating a phosphorus component which has been sorbed in the cleaning agent during the course of cleaning the harmful gas from a copper component; and recovering the copper component of the cleaning agent.

The method of the present invention is drawn to a method of recovering a cleaning agent, the cleaning agent having been used for removing, through contact with a harmful gas, a silane gas contained as a harmful component in the harmful gas, and being a cleaning agent containing basic copper carbonate as a component thereof or a cleaning agent containing copper hydroxide as a component thereof, the method comprising: immersing the cleaning agent in an acidic solution, to thereby transform a copper component to a soluble copper salt and cause a silicon component to precipitate in the form of silicon oxide, the silicon component having been sorbed in the cleaning agent during the course of cleaning the harmful gas; separating the silicon component from the copper component; adding a precipitant for copper to the solution from which the silicon component has been removed, to thereby cause a copper compound to precipitate; and recovering the copper component of the cleaning agent.

The method of the present invention is drawn to a method of recovering a cleaning agent, the cleaning agent having been used for removing, through contact with a harmful gas, a phosphine contained as a harmful component in the harmful gas, and containing copper oxide and manganese oxide as components thereof, the method comprising: immersing the cleaning agent in an acidic solution, to thereby dissolve the cleaning agent; adding to the resultant solution a precipitant for copper and manganese or a precipitant for phosphorus, to thereby cause either a copper compound and a manganese compound or a phosphorus compound to precipitate; separating a phosphorus component which has been sorbed in the cleaning agent during the course of cleaning the harmful gas from a copper component and a manganese component; and recovering the copper component and the manganese component of the cleaning agent.

The method of the present invention is drawn to a method of recovering a cleaning agent, the cleaning agent having been used for removing, through contact with a harmful gas, a silane gas contained as a harmful component in the harmful gas, and containing copper oxide and manganese oxide as components thereof, the method comprising: immersing the cleaning agent in an acidic solution, to thereby transform a copper component and a manganese component to a soluble copper salt and a soluble manganese salt, respectively, and cause a silicon component to precipitate in the form of silicon oxide, the silicon component having been sorbed in the cleaning agent during the course of cleaning the harmful gas; separating the silicon component from the copper component and the manganese component; and recovering the copper component and the manganese compound of the cleaning agent.

The harmful gas to which the method of the present invention is to be applied is a gas containing as a harmful component at least a phosphine and/or a silane gas, such as silane or disilane. The base gas of the harmful gas is typically a gas such as nitrogen, argon, helium, or hydrogen. In the present invention, the phosphine serving as a harmful component includes phosphine, diphosphine, and alkylphosphines such as monomethylphosphine and t-butylphosphine, and the silane gas includes silane, disilane, and silicon halogenides such as monochlorosilane and dichlorosilane.

In the present invention, before use, the cleaning agent contains as a component thereof at least copper oxide, basic copper carbonate, copper hydroxide, or copper oxide and manganese oxide.

The cleaning agent containing copper oxide as a component thereof may contain, in addition to copper oxide, at least one metal selected from lithium, sodium, potassium, magnesium, calcium, strontium, barium, titanium, zirconium, lanthanum, vanadium, niobium, tantalum, molybdenum, tungsten, iron, cobalt, nickel, zinc, aluminum, silicon, tin, lead, antimony, bismuth, and copper, and/or at least one oxide of these metal other than copper oxide.

The cleaning agent containing basic copper carbonate or copper hydroxide as a component thereof may contain, in addition to basic copper carbonate or copper hydroxide, at least one metal selected from lithium, sodium, potassium, magnesium, calcium, strontium, barium, titanium, zirconium, lanthanum, vanadium, niobium, tantalum, molybdenum, tungsten, iron, cobalt, nickel, zinc, aluminum, silicon, tin, lead, antimony, bismuth, and copper, and/or at least one oxide of these metal.

The cleaning agent containing copper oxide and manganese oxide as components thereof may contain, in addition to copper oxide and manganese oxide, at least one metal selected from lithium, sodium, potassium, magnesium, calcium, strontium, barium, titanium, zirconium, lanthanum, vanadium, niobium, tantalum, molybdenum, tungsten, iron, cobalt, nickel, silver, platinum, ruthenium, palladium, zinc, aluminum, silicon, tin, lead, antimony, bismuth, copper, and manganese, and/or at least one metallic compound other than copper oxide and manganese oxide.

Even when the cleaning agent to be treated in the present invention contains the above-described metal, metal oxide, or metal compound, the cleaning agent typically contains, before use, copper oxide, basic copper carbonate, copper hydroxide, and/or copper oxide and manganese oxide in a total amount of 70 wt. % or more.

In the present invention, the cleaning agent from which the component is to be recovered includes the aforementioned cleaning agents; i.e., a cleaning agent containing copper oxide as a component thereof, a cleaning agent containing basic copper carbonate as a component thereof, a cleaning agent containing copper hydroxide as a component thereof, and a cleaning agent containing copper oxide and manganese oxide as components thereof, the agents having been used for removing, through contact with a harmful gas, a phosphine contained as a harmful component in the harmful gas; and a cleaning agent containing basic copper carbonate as a component thereof, a cleaning agent containing copper hydroxide as a component thereof, and a cleaning agent containing copper oxide and manganese oxide as components thereof, the cleaning agents having been used for removing, through contact with a harmful gas, a silane gas contained as a harmful component in the harmful gas.

According to the method of recovering a cleaning agent of the present invention, a copper component or a manganese component can be recovered, as a highly valuable component of a cleaning agent having cleaning performance virtually equivalent to that of the unused agent, from a cleaning agent containing as a component(s) copper oxide, basic copper carbonate, copper hydroxide, or copper oxide and manganese oxide, the cleaning agents having been used for cleaning a harmful gas. Examples of the highly valuable component include copper oxide, basic copper carbonate, and copper hydroxide, each having a BET specific surface area of 10 m$^2$/g or more, and manganese oxide having a BET specific surface area of 50 m$^2$/g or more. From these recovered components, a cleaning agent having a BET specific surface area of 10 m$^2$/g or more can be prepared. Furthermore, according to the method of recovering a cleaning agent of the present invention, there can be recovered copper oxide, basic copper carbonate, or copper hydroxide, each having a BET specific surface area of 50 m$^2$/g or more, or manganese oxide having a BET specific surface area of 150 m$^2$/g or more. From the above recovered components, a cleaning agent having a BET specific surface area of 50 m$^2$/g or more can be prepared.

There will next be described in detail the method of recovering a copper component from a cleaning agent containing copper oxide, a cleaning agent containing basic copper carbonate, or a cleaning agent containing copper hydroxide, the agents having been used for removing, through contact with a harmful gas, a phosphine contained as a harmful component in the harmful gas.

The cleaning agent containing copper oxide, the cleaning agent containing basic copper carbonate, or the cleaning agent containing copper hydroxide, the cleaning agents having been used for removing, through contact with a harmful gas, a phosphine contained as a harmful component in the harmful gas, is removed from a cleaning column, and then immersed in an acidic solution, to thereby dissolve in the solution. Examples of the acidic solution to be used for dissolving the cleaning agent include inorganic acids such as sulfuric acid, nitric acid, and hydrochloric acid, and organic acids such as formic acid and acetic acid. Of these, sulfuric acid, nitric acid, and hydrochloric acid are preferred, in that these acids can readily dissolve the used cleaning agent.

The concentration of the acidic solution and the amount of the solution to the cleaning agent are not particularly limited, and vary in accordance with conditions such as the type of the cleaning agent and the type of the acidic solution. However, the acidic solution can be used under conditions such that soluble components of the cleaning agent can readily dissolved. In the case in which sulfuric acid, nitric acid, or hydrochloric acid is used, the concentration is not particularly limited. The concentration is preferably 5–30 wt. %, and the amount of the acidic solution based on 1 kg of the cleaning agent is typically approximately 1–25 kg, preferably approximately 4–12 kg. The temperature upon immersion of the cleaning agent in the acidic solution for dissolution is typically 100° C. or lower, preferably 30–80° C.

To the acidic solution in which the aforementioned cleaning agent has been dissolved, a precipitant for copper or a precipitant for phosphorus is added, to thereby cause a copper compound or a phosphorus compound to precipitate. Examples of the precipitant for copper include lithium hydroxide, sodium hydroxide, potassium hydroxide, ammonium hydroxide, sodium carbonate, potassium carbonate, ammonium carbonate, sodium hydrogencarbonate, potassium hydrogencarbonate, and ammonium hydrogencarbonate. Examples of the precipitant for phosphorus include magnesium chloride, calcium chloride, magnesium sulfate, magnesium nitrate, and calcium nitrate.

As described above, the copper component can be separated from the phosphorus component. When the copper component is separated through precipitation of a phosphorus compound, the copper component remains dissolved in the solution, and therefore, a precipitant for copper must be added. In either case, the copper component can be precipitated in the form of basic copper carbonate or copper hydroxide by, for example, adjusting pH during precipitation. The thus-yielded precipitate is washed with water and dried, to thereby recover the copper component in the form of basic copper carbonate or copper hydroxide. Alternatively, after the precipitate has been washed with water and dried, the dried product is calcined, to thereby recover the copper component in the form of copper oxide. The basic copper carbonate, copper hydroxide, or copper oxide which is recovered in the aforementioned manner can be provided with a BET specific surface area equal to that of the unused cleaning agent. In the method of the present invention for recovering a cleaning agent, the component to be recovered is not limited to a copper component, but may also include other metallic components in combination with the copper component.

There will next be described in detail the method of recovering a copper component from a cleaning agent containing basic copper carbonate or a cleaning agent containing copper hydroxide, the agents having been used for removing, through contact with a harmful gas, a silane gas contained as a harmful component in the harmful gas.

In a manner similar to that described above, the cleaning agent containing basic copper carbonate or the cleaning agent containing copper hydroxide, the cleaning agents having been used for cleaning a harmful gas containing a silane gas as a harmful component, is removed from a cleaning column, and then immersed in an acidic solution. When the used cleaning agent is immersed in an acidic solution, the copper component contained in the cleaning agent is dissolved in the acidic solution, to thereby transform into a soluble copper salt, and a silicon component which has been sorbed in the cleaning agent during the course of a cleaning process is precipitated in the form of silicon oxide.

Examples of the acidic solution to be used for dissolving the cleaning agent include inorganic acids such as sulfuric acid, nitric acid, and hydrochloric acid, and organic acids such as formic acid and acetic acid. Of these, sulfuric acid, nitric acid, and hydrochloric acid are preferred, for the same reason as described above. The concentration of the acidic solution and the amount of the solution to be added to the cleaning agent are adjusted in a manner similar to that of the aforementioned case. For example, in the case in which sulfuric acid, nitric acid, or hydrochloric acid is used, the concentration is preferably 5–30 wt. %, and the amount of the acidic solution based on 1 kg of the cleaning agent is typically approximately 1–25 kg, preferably approximately 4–12 kg. The temperature upon immersion of the cleaning agent in the acidic solution for dissolution is typically 100° C. or lower, preferably 30–80° C.

Upon or after immersion of the used cleaning agent, hydrogen peroxide may also be added to the acidic solution, to thereby promote solidification of silicon.

To the solution containing a copper component from which solution the silicon component has been removed in the aforementioned manner, a precipitant for copper is added. Examples of the precipitant for copper include lithium hydroxide, sodium hydroxide, potassium hydroxide, ammonium hydroxide, sodium carbonate, potassium carbonate, ammonium carbonate, sodium hydrogencarbonate, potassium hydrogencarbonate, and ammonium hydrogencarbonate. During precipitation, by, for example, adjusting pH, the copper component can be precipitated in the form of basic copper carbonate or copper hydroxide. The thus-yielded precipitate is washed with water and dried, to thereby recover the copper component in the form of basic copper carbonate or copper hydroxide. Alternatively, after the precipitate has been washed with water and dried, the dried product is calcined, to thereby recover the copper component in the form of copper oxide. The basic copper carbonate, copper hydroxide, or copper oxide which is recovered in the aforementioned manner can be provided with a BET specific surface area equal to that of the unused cleaning agent to be used for cleaning a harmful gas containing a silane gas. In the method of the present invention for recovering a cleaning agent, the component to be recovered is not limited to a copper component, but may also include other metallic components in combination with the copper component.

There will next be described in detail the method of recovering a copper component and a manganese component from a cleaning agent containing copper oxide and manganese oxide, the cleaning agent having been used for removing, through contact with a harmful gas, a phosphine contained as a harmful component in the harmful gas.

In a manner similar to that described above, the cleaning agent containing copper oxide and manganese oxide, the cleaning agent having been used for cleaning a harmful gas containing a phosphine as a harmful component, is removed from a cleaning column, and then immersed in an acidic solution, to thereby dissolve in the solution. Examples of the acidic solution to be used for dissolving the cleaning agent include inorganic acids such as sulfuric acid, nitric acid, and hydrochloric acid, and organic acids such as formic acid and acetic acid. Of these, sulfuric acid, nitric acid, and hydrochloric acid are preferred, for the same reason as described above.

The concentration of the acidic solution, the amount of the solution to be added to the cleaning agent, and the temperature upon immersion of the cleaning agent in the acidic solution are adjusted in a manner similar to that of the aforementioned case. Since manganese is somewhat difficult to dissolve in an acidic solution, a reducing agent is preferably added to the solution, upon or after immersion of the cleaning agent in the solution, to thereby enhance solubility of manganese in the solution. Examples of the reducing agent include hydrogen peroxide, formic acid, acetic acid, and sulfurous acid.

To the acidic solution in which the cleaning agent has been dissolved in a previously mentioned manner, a precipitant for copper and manganese or a precipitant for phosphorus is added, to thereby cause either a copper component and a manganese component or a phosphorus compound to precipitate in the form of copper compound and manganese compound or phosphorus compound. Thus, the copper component and the manganese component are isolated from the phosphorus component. Precipitants similar to those employed for copper can be used as precipitants for copper and manganese.

As described above, the copper component and the manganese component can be separated from the phosphorus component. When the copper component and the manganese component are separated through precipitation of a phosphorus compound, the copper component and the manganese component remain dissolved in the solution, and therefore, a precipitant for copper and manganese must be added. In either case, the copper component and the manganese component can both be precipitated in the form of basic copper carbonate and manganese carbonate by, for example, adjusting pH during precipitation. The thus-yielded precipitate is washed with water, dried, and calcined, to thereby recover the copper component and the manganese component in the form of a mixture of copper oxide and manganese oxide. The copper oxide and manganese oxide which are recovered in the aforementioned manner can be provided with a BET specific surface area equal to that of the unused cleaning agent. In the method of the present invention for recovering a cleaning agent, the component to be recovered is not limited to a copper component and a manganese component, but may also include other metallic components in combination with the copper component and the manganese compound.

There will next be described in detail the method of recovering a copper component and a manganese component from a cleaning agent containing copper oxide and manganese oxide, the cleaning agent having been used for removing, through contact with a harmful gas, a silane gas contained as a harmful component in the harmful gas.

In a manner similar to that described above, the cleaning agent containing copper oxide and manganese oxide, the cleaning agent having been used for cleaning a harmful gas containing a silane gas as a harmful component, is removed from a cleaning column, and then immersed in an acidic solution. Examples of the acidic solution to be used for dissolving the cleaning agent include inorganic acids such as sulfuric acid, nitric acid, and hydrochloric acid, and organic acids such as formic acid and acetic acid. Of these, sulfuric acid, nitric acid, and hydrochloric acid are preferred, for the same reason as described above.

The concentration of the acidic solution, the amount of the solution to be added to the cleaning agent, and the temperature upon immersion of the cleaning agent in the acidic solution are adjusted in a manner similar to that of the aforementioned case. Since manganese is somewhat difficult to dissolve in an acidic solution, a reducing agent is preferably added to the solution, upon or after immersion of the cleaning agent in the solution, to thereby enhance solubility of manganese in the solution. Examples of the reducing agent include hydrogen peroxide, formic acid, acetic acid, and sulfurous acid. Of these, hydrogen peroxide is preferred, in that hydrogen peroxide can promote solidification of silicon as well as solubility of manganese in an acidic solution.

By immersing the cleaning agent in the acidic solution, copper and manganese form a soluble copper salt and a soluble manganese salt, respectively, while silicon which has been sorbed in the cleaning agent during the course of cleaning the harmful gas is precipitated in the form of silicon oxide.

To the solution containing a copper component and a manganese component, the silicon component having been removed from the solution in the aforementioned manner, a precipitant for copper and manganese is added, to thereby cause a copper compound and a manganese compound to precipitate. Examples of the precipitant for copper and manganese include lithium hydroxide, sodium hydroxide, potassium hydroxide, ammonium hydroxide, sodium carbonate, potassium carbonate, ammonium carbonate, sodium hydrogencarbonate, potassium hydrogencarbonate, and ammonium hydrogencarbonate. During precipitation, by, for example, adjusting pH, the copper component and the manganese component can be precipitated in the form of basic copper carbonate and manganese carbonate, respectively. The thus-yielded precipitate is washed with water, dried, and calcined, to thereby recover the copper component and the manganese component in the form of a mixture of copper oxide and manganese oxide. The copper oxide and manganese oxide which are recovered in the aforementioned manner can be provided with a BET specific surface area equal to that of the unused cleaning agent. In the method of the present invention for recovering a cleaning agent, the component to be recovered is not limited to a copper component and a manganese component, but may also include other metallic components in combination with the copper component and the manganese component.

According to the method of the present invention for recovering a cleaning agent, a copper component or a manganese component can be effectively recovered, in a recyclable form, from a cleaning agent containing copper oxide as a component thereof, a cleaning agent containing basic copper carbonate as a component thereof, a cleaning agent containing copper hydroxide as a component thereof, or a cleaning agent containing copper oxide and manganese oxide as components thereof, the cleaning agents having been used for removing a phosphine contained in a discharge gas produced during a semiconductor production step or a similar step. Also, a copper component or a manganese component can be effectively recovered, in a recyclable form, from a cleaning agent containing basic copper carbonate as a component thereof, a cleaning agent containing copper hydroxide as a component thereof, or a cleaning agent containing copper oxide and manganese oxide as components thereof, the cleaning agents having been used for removing a silane gas contained in a discharge gas produced during a semiconductor production step or a similar step.

The present invention will next be described in more detail by way of examples, which should not be construed as limiting the invention thereto.

EXAMPLE 1

Preparation of Cleaning Agent Containing Copper Oxide

Commercial copper sulfate pentahydrate (1.5 kg) was dissolved in ion-exchange water (5 L). To the resultant solution, a 15 wt. % aqueous solution (4.3 kg) of sodium carbonate was added, to thereby cause a copper component to precipitate. The resultant precipitate was filtered, washed with water, and kneaded with a 10 wt. % alumina sol (200 g) by means of a kneader. The resultant mixture was dried at 120° C. and calcined at 350° C., to thereby prepare a cleaning agent raw material comprising cupric oxide (96 wt. %) and aluminum oxide (4 wt. %). The thus-prepared raw material was formed into pellets (diameter: 6 mm, height: 6 mm). The pellets were milled, and, after having passed 12-mesh to 28-mesh sieves, the product was employed as a cleaning agent A. The BET specific surface area of the cleaning agent A, as measured by means of a gas adsorption amount measurement apparatus (Autosorb 3B, product of Yuasa Ionics), was 70 $m^2/g$.

Cleaning Harmful Gas Containing Phosphine

The cleaning agent A was charged into a cleaning column (inside diameter: 40 mm) made of hard glass such that the pack length was adjusted to 100 mm. Into this cleaning column, a dry-nitrogen-based gas containing phosphine (10,000 ppm) as a harmful component was caused to pass at a flow rate of 2,000 ml/min (superficial velocity: 2.65 cm/sec) at a temperature of 20° C. under atmospheric pressure. During passage of the gas, a portion of the gas flowing from the outlet of the cleaning column was aspirated into a detection tube (Phosphine 7 L, product of Gastech, detection limit: 0.15 ppm), and the time elapsed until detection of phosphine (effective treatment time) was measured, to thereby obtain the amount (L) of phosphine removed per liter (L) of a cleaning agent (cleaning performance). The results are shown in Table 1.

Recovery of Copper Component from Cleaning Agent

The cleaning agent A, having been used in a manner similar to that employed in the aforementioned cleaning of a harmful gas containing phosphine, was collected in an amount of 500 g, and the collected cleaning agent was immersed in a 10 wt. % aqueous sulfuric acid solution (6 kg) for dissolution. Insoluble components were removed from the acid solution through filtration, and a 15 wt. % aqueous solution (4.3 kg) of sodium carbonate serving as a precipitant for copper was added to the filtrate, to thereby cause a copper component to precipitate. The resultant precipitate was filtered, washed with water, and kneaded with aluminum oxide (16 g) by means of a kneader. The resultant mixture was dried at 120° C. and calcined at 350° C., to thereby recover the copper component in the form of cupric oxide. The thus-recovered matter was found to comprise cupric oxide (96 wt. %) and aluminum oxide (4 wt. %). The recovered matter was further formed into pellets (diameter: 6 mm, height: 6 mm). The pellets were milled, and, after having passed 12-mesh to 28-mesh sieves, the milled product was employed as a cleaning agent A'. The BET specific surface area of the cleaning agent A' was found to be 72 $m^2/g$.

In the aforementioned procedure, the precipitate was filtered, washed with water, and dried, to thereby recover basic copper carbonate. The BET specific surface area of the basic copper carbonate, as measured by means of a gas adsorption amount measurement apparatus, was 60 $m^2/g$. The obtained basic copper carbonate was calcined, to thereby recover cupric oxide having a BET specific surface area of 69 $m^2/g$. In order to recover copper hydroxide, the aforementioned procedure was repeated, except that a 4.1 wt. % aqueous solution (6.0 kg) of sodium hydroxide was used as a precipitant for copper instead of the aqueous solution of sodium carbonate, to thereby cause a copper component to precipitate. The precipitate was filtered, washed with water, and dried at 120° C., to thereby recover the copper component in the form of copper hydroxide. The BET specific surface area of the recovered copper hydroxide was found to be 42 $m^2/g$.

Cleaning Harmful Gas Containing Phosphine by Use of Regenerated Cleaning Agent

In a manner similar to that employed in the cleaning of a harmful gas by means of the cleaning agent A, the cleaning agent A' was charged into a cleaning column (inside diameter: 40 mm) made of hard glass such that the pack length was adjusted to 100 mm. Into this cleaning column, a dry-nitrogen-based gas containing phosphine (10,000 ppm) as a harmful component was caused to pass at a flow rate of 2,000 ml/min (superficial velocity: 2.65 cm/sec) at a temperature of 20° C. under atmospheric pressure, to thereby perform a cleaning test. The measurement results in terms of cleaning performance of the cleaning agent A' are shown in Table 1.

EXAMPLE 2

Preparation of Cleaning Agent Containing Copper Oxide

Commercial copper sulfate pentahydrate (1.5 kg) was dissolved in ion-exchange water (5 L). To the resultant solution, a 15 wt. % aqueous solution (4.3 kg) of sodium carbonate was added, to thereby cause a copper component to precipitate. The resultant precipitate was filtered, washed with water, and kneaded with zirconium oxide (25 g) by means of a kneader. The resultant mixture was dried at 120° C. and calcined at 350° C., to thereby prepare a cleaning agent raw material comprising cupric oxide (95 wt. %) and zirconium oxide (5 wt. %). The thus-prepared raw material was formed into pellets (diameter: 6 mm, height: 6 mm). The pellets were milled, and, after having passed 12-mesh to 28-mesh sieves, the product was employed as a cleaning agent B. The BET specific surface area of the cleaning agent B was found to be 65 $m^2/g$.

Cleaning Harmful Gas Containing Phosphine

The procedure of Example 1 was repeated, except that the cleaning agent B was used instead of the cleaning agent A employed in "Cleaning Harmful Gas Containing Phosphine" of Example 1, to thereby clean a harmful gas containing phosphine. The measurement results in terms of cleaning performance of the cleaning agent B are shown in Table 1.

Recovery of Copper Component from Cleaning Agent

The cleaning agent B, having been used in a manner similar to that employed in the aforementioned cleaning of a harmful gas containing phosphine, was collected in an amount of 500 g, and the collected cleaning agent was immersed in a 10 wt. % aqueous sulfuric acid solution (6 kg) for dissolution. Insoluble components were removed from the acid solution through filtration, and a 15 wt. % aqueous solution (4.3 kg) of sodium carbonate serving as a precipitant for copper was added to the filtrate, to thereby cause a copper component to precipitate. The resultant precipitate was filtered, washed with water, and kneaded with zirconium oxide (20 g) by means of a kneader. The resultant mixture was dried at 120° C. and calcined at 350° C., to thereby recover the copper component in the form of cupric oxide. The thus-recovered matter was found to comprise cupric oxide (95 wt. %) and zirconium oxide (5 wt. %). The recovered matter was further formed into pellets (diameter: 6 mm, height: 6 mm). The pellets were milled, and, after having passed 12-mesh to 28-mesh sieves, the milled product was employed as a cleaning agent B'. The BET specific surface area of the cleaning agent B' was found to be 68 $m^2/g$.

Cleaning Harmful Gas Containing Phosphine by Use of Regenerated Cleaning Agent

The procedure of Example 1 was repeated, except that the cleaning agent B' was used instead of the cleaning agent A' employed in "Cleaning Harmful Gas Containing Phosphine by Use of Regenerated Cleaning Agent" of Example 1, to thereby perform a cleaning test for a harmful gas containing phosphine. The measurement results in terms of cleaning performance of the cleaning agent B' are shown in Table 1.

EXAMPLE 3

Preparation of Cleaning Agent Containing Copper Oxide

Commercial copper sulfate pentahydrate (1.5 kg) was dissolved in ion-exchange water (5 L). To the resultant solution, a 15 wt. % aqueous solution (4.3 kg) of sodium carbonate was added, to thereby cause a copper component to precipitate. The resultant precipitate was filtered, washed with water, and kneaded with zinc oxide (20 g) by means of a kneader. The resultant mixture was dried at 120° C. and calcined at 350° C., to thereby prepare a cleaning agent raw material comprising cupric oxide (96 wt. %) and zinc oxide (4 wt. %). The thus-prepared raw material was formed into pellets (diameter: 6 mm, height: 6 mm). The pellets were milled, and, after having passed 12-mesh to 28-mesh sieves, the product was employed as a cleaning agent C. The BET specific surface area of the cleaning agent C was found to be 80 $m^2/g$.

Cleaning Harmful Gas Containing t-Butylphosphine

The procedure of Example 1 was repeated, except that a gas containing t-butylphosphine (10,000 ppm) was used instead of a gas containing phosphine (10,000 ppm) and that the cleaning agent C was used instead of the cleaning agent A employed in "Cleaning Harmful Gas Containing Phosphine" of Example 1, to thereby clean a harmful gas containing t-butylphosphine. The measurement results in terms of cleaning performance of the cleaning agent C are shown in Table 1.

Recovery of Copper Component from Cleaning Agent

The cleaning agent C, having been used in a manner similar to that employed in the aforementioned cleaning of a harmful gas containing t-butylphosphine, was collected in an amount of 500 g, and the collected cleaning agent was immersed in a 10 wt. % aqueous nitric acid solution (7.6 kg) for dissolution. Insoluble components were removed from the acid solution through filtration, and a 15 wt. % aqueous solution (3.2 kg) of sodium hydroxide serving as a precipitant for copper was added to the filtrate, to thereby cause a copper component to precipitate. The resultant precipitate was filtered, washed with water, and kneaded with zinc oxide (16 g) by means of a kneader. The resultant mixture was dried at 120° C. and calcined at 350° C., to thereby recover the copper component in the form of cupric oxide. The thus-recovered matter was found to comprise cupric oxide (96 wt. %) and zinc oxide (4 wt. %). The recovered matter was further formed into pellets (diameter: 6 mm, height: 6 mm). The pellets were milled, and, after having passed 12-mesh to 28-mesh sieves, the product was employed as a cleaning agent C'. The BET specific surface area of the cleaning agent C' was found to be 75 m²/g.

Cleaning Harmful Gas Containing t-Butylphosphine by Use of Regenerated Cleaning Agent The procedure of Example 1 was repeated, except that a gas containing t-butylphosphine (10,000 ppm) was used instead of a gas containing phosphine (10,000 ppm) and that the cleaning agent C' was used instead of the cleaning agent A' employed in "Cleaning Harmful Gas Containing Phosphine by Use of Regenerated Cleaning Agent" of Example 1, to thereby perform a cleaning test for a harmful gas containing t-butylphosphine. The measurement results in terms of cleaning performance of the cleaning agent C' are shown in Table 1.

EXAMPLE 4
Preparation of Cleaning Agent Containing Copper Oxide

Commercial copper sulfate pentahydrate (1.5 kg) was dissolved in ion-exchange water (5 L). To the resultant solution, a 15 wt. % aqueous solution (4.3 kg) of sodium carbonate was added, to thereby cause a copper component to precipitate. The resultant precipitate was filtered, washed with water, and kneaded with silicon dioxide (30 g) by means of a kneader. The resultant mixture was dried at 120° C. and calcined at 350° C., to thereby prepare a cleaning agent raw material comprising cupric oxide (94 wt. %) and silicon dioxide (6 wt. %). The thus-prepared raw material was formed into pellets (diameter: 6 mm, height: 6 mm). The pellets were milled, and, after having passed 12-mesh to 28-mesh sieves, the product was employed as a cleaning agent D. The BET specific surface area of the cleaning agent D was found to be 70 m²/g.

Cleaning Harmful Gas Containing Phosphine

The procedure of Example 1 was repeated, except that the cleaning agent D was used instead of the cleaning agent A employed in "Cleaning Harmful Gas Containing Phosphine" of Example 1, to thereby clean a harmful gas containing phosphine. The measurement results in terms of cleaning performance of the cleaning agent D are shown in Table 1.

Recovery of Copper Component from Cleaning Agent

The cleaning agent D, having been used in a manner similar to that employed in the aforementioned cleaning of a harmful gas containing phosphine, was collected in an amount of 500 g, and the collected cleaning agent was immersed in a 10 wt. % aqueous sulfuric acid solution (6 kg) for dissolution. Insoluble components were removed from the acid solution through filtration, and a 15 wt. % aqueous solution (1.5 kg) of magnesium sulfate serving as a precipitant for phosphorus was added to the filtrate, to thereby cause a phosphorus component to precipitate. The resultant precipitate was removed through filtration. A 15 wt. % aqueous solution (4.3 kg) of sodium carbonate serving as a precipitant for copper was added to the resultant filtrate, to thereby cause a copper component to precipitate. The obtained precipitate was filtered, washed with water, and kneaded with silicon dioxide (30 g) by means of a kneader. The resultant mixture was dried at 120° C. and calcined at 350° C., to thereby recover the copper component in the form of cupric oxide. The thus-recovered matter was found to comprise cupric oxide (94 wt. %) and silicon dioxide (6 wt. %). The recovered matter was further formed into pellets (diameter: 6 mm, height: 6 mm). The pellets were milled, and, after having passed 12-mesh to 28-mesh sieves, the product was employed as a cleaning agent D'. The BET specific surface area of the cleaning agent D' was found to be 68 m²/g.

Cleaning Harmful Gas Containing Phosphine by Use of Regenerated Cleaning Agent

The procedure of Example 1 was repeated, except that the cleaning agent D' was used instead of the cleaning agent A' employed in "Cleaning Harmful Gas Containing Phosphine by Use of Regenerated Cleaning Agent" of Example 1, to thereby perform a cleaning test for a harmful gas containing phosphine. The measurement results in terms of cleaning performance of the cleaning agent D' are shown in Table 1.

EXAMPLE 5
Preparation of Cleaning Agent Containing Copper Oxide and Manganese Oxide Commercial copper sulfate pentahydrate (0.5 kg) and manganese sulfate heptahydrate (1.4 kg) were dissolved in ion-exchange water (5 L). To the resultant solution, a 15 wt. % aqueous solution (4.3 kg) of sodium carbonate was added, to thereby cause a copper component and a manganese component to precipitate. The resultant precipitate was filtered, washed with water, and kneaded with 10 wt. % alumina sol (380 g) by means of a kneader. The resultant mixture was dried at 120° C., to thereby prepare a cleaning agent raw material comprising cupric oxide (25 wt. %), manganese dioxide (69 wt. %), and aluminum oxide (6 wt. %). The thus-prepared raw material was formed into pellets (diameter: 6 mm, height: 6 mm). The pellets were milled, and, after having passed 12-mesh to 28-mesh sieves, the product was employed as a cleaning agent E. The BET specific surface area of the cleaning agent E was found to be 165 m²/g.

Cleaning Harmful Gas Containing Phosphine

The procedure of Example 1 was repeated, except that the cleaning agent E was used instead of the cleaning agent A employed in "Cleaning Harmful Gas Containing Phosphine" of Example 1, to thereby clean a harmful gas containing phosphine. The measurement results in terms of cleaning performance of the cleaning agent E are shown in Table 1.

Recovery of Copper Component and Manganese Component from Cleaning Agent

The cleaning agent E, having been used in a manner similar to that employed in the aforementioned cleaning of a harmful gas containing phosphine, was collected in an amount of 500 g, and the collected cleaning agent was immersed in a mixture containing a 10 wt. % aqueous sulfuric acid solution (5.6 kg) and a 30 wt. % aqueous hydrogen peroxide solution (0.2 kg) for dissolution. Insoluble components were removed from the mixture solution through filtration, and a 15 wt. % aqueous solution (4 kg) of sodium carbonate serving as a precipitant for copper and manganese was added to the filtrate, to thereby cause a copper component and a manganese component to precipitate. The obtained precipitate was filtered, washed with water, and kneaded with aluminum oxide (24 g) by means of a kneader. The resultant mixture was dried at 120° C., to thereby recover the copper component and the manganese component in the form of cupric oxide and manganese dioxide, respectively. The thus-recovered matter was found to comprise cupric oxide (25 wt. %), manganese dioxide (69 wt. %), and aluminum oxide (6 wt. %). In the above operation, if no aluminum oxide is added to the precipitate containing the copper component and the manganese component, only cupric oxide and manganese oxide can be recovered. The recovered matter was further formed into pellets (diameter: 6 mm, height: 6 mm). The pellets were milled, and, after having passed 12-mesh to 28-mesh sieves, the product was employed as a cleaning agent E'. The BET specific surface area of the cleaning agent E' was found to be 170 $m^2/g$.

Cleaning Harmful Gas Containing Phosphine by Use of Regenerated Cleaning Agent

The procedure of Example 1 was repeated, except that the cleaning agent E' was used instead of the cleaning agent A' employed in "Cleaning Harmful Gas Containing Phosphine by Use of Regenerated Cleaning Agent" of Example 1, to thereby perform a cleaning test for a harmful gas containing phosphine. The measurement results in terms of cleaning performance of the cleaning agent E' are shown in Table 1.

EXAMPLE 6

Preparation of Cleaning Agent Containing Copper Oxide and Manganese Oxide

The procedure of Example 5 was repeated, to thereby prepare a cleaning agent F comprising cupric oxide (25 wt. %), manganese dioxide (69 wt. %), and aluminum oxide (6 wt. %). The BET specific surface area of the cleaning agent F was found to be 163 $m^2/g$.

Cleaning Harmful Gas Containing Phosphine

The procedure of Example 1 was repeated, except that the cleaning agent F was used instead of the cleaning agent A employed in "Cleaning Harmful Gas Containing Phosphine" of Example 1, to thereby clean a harmful gas containing phosphine. The measurement results in terms of cleaning performance of the cleaning agent F are shown in Table 1.

Recovery of Copper Component and Manganese Component from Cleaning Agent

The cleaning agent F, having been used in a manner similar to that employed in the aforementioned cleaning of a harmful gas containing phosphine, was collected in an amount of 500 g, and the collected cleaning agent was immersed in a mixture containing a 10 wt. % aqueous sulfuric acid solution (5.6 kg) and a 30 wt. % aqueous hydrogen peroxide solution (0.2 kg) for dissolution. Insoluble components were removed from the mixture solution through filtration, and a 15 wt. % aqueous solution (1.5 kg) of magnesium sulfate serving as a precipitant for phosphorus was added to the filtrate, to thereby cause a phosphorus component to precipitate. The precipitate of the phosphorus component was removed through filtration. A 15 wt. % aqueous solution (4 kg) of sodium carbonate serving as a precipitant for copper and manganese was added to the resultant filtrate, to thereby cause a copper component and a manganese component to precipitate. The obtained precipitate was filtered, washed with water, and kneaded with aluminum oxide (24 g) by means of a kneader. The resultant mixture was dried at 120° C., to thereby recover the copper component and the manganese component in the form of cupric oxide and manganese dioxide, respectively. The thus-recovered matter was found to comprise cupric oxide (25 wt. %), manganese dioxide (69 wt. %), and aluminum oxide (6 wt. %). The recovered matter was further formed into pellets (diameter: 6 mm, height: 6 mm). The pellets were milled, and, after having passed 12-mesh to 28-mesh sieves, the product was employed as a cleaning agent F'. The BET specific surface area of the cleaning agent F' was found to be 167 $m^2/g$.

Cleaning Harmful Gas Containing Phosphine by Use of Regenerated Cleaning Agent

The procedure of Example 1 was repeated, except that the cleaning agent F' was used instead of the cleaning agent A' employed in "Cleaning Harmful Gas Containing Phosphine by Use of Regenerated Cleaning Agent" of Example 1, to thereby perform a cleaning test for a harmful gas containing phosphine. The measurement results in terms of cleaning performance of the cleaning agent F' are shown in Table 1.

EXAMPLE 7

Preparation of Cleaning Agent Containing Copper Oxide and Manganese Oxide

The procedure of Example 5 was repeated, to thereby prepare a cleaning agent G comprising cupric oxide (25 wt. %), manganese dioxide (69 wt. %), and aluminum oxide (6 wt. %). The BET specific surface area of the cleaning agent G was found to be 166 $m^2/g$.

Cleaning Harmful Gas Containing Silane

The cleaning agent G was charged into a cleaning column (inside diameter: 40 mm) made of hard glass such that the pack length was adjusted to 100 mm. Into this cleaning column, a dry-nitrogen-based gas containing silane (10,000 ppm) as a harmful component was caused to pass at 20° C. under atmospheric pressure at a flow rate of 2,000 ml/min (superficial velocity: 2.65 cm/sec). During passage of the gas, a portion of the gas flowing from the outlet of the cleaning column was aspirated into a detection tube (Silane S, product of Komyo Rikagaku Kogyo, detection limit: 0.5 ppm), and the time elapsed until detection of silane (effective treatment time) was measured, to thereby obtain the amount (L) of silane removed per liter (L) of a cleaning agent (cleaning performance). The results are shown in Table 1.

Recovery of Copper Component and Manganese Component from Cleaning Agent

The cleaning agent G, having been used in a manner similar to that employed in the aforementioned cleaning of a harmful gas containing silane, was collected in an amount of 500 g, and the collected cleaning agent was immersed in a mixture containing a 10 wt. % aqueous sulfuric acid solution (5.6 kg) and a 30 wt. % aqueous hydrogen peroxide solution (0.2 kg). Insoluble components were removed from the mixture solution through filtration, and a 15 wt. % aqueous solution (4 kg) of sodium carbonate serving as a precipitant for copper and manganese was added to the filtrate, to thereby cause a copper component and a manganese component to precipitate. The obtained precipitate was filtered, washed with water, and kneaded with aluminum oxide (24 g) by means of a kneader. The resultant mixture was dried at 120° C., to thereby recover the copper component and the manganese component in the form of cupric oxide and manganese dioxide, respectively. The thus-recovered matter was found to comprise cupric oxide (25 wt. %), manganese dioxide (69 wt. %), and aluminum oxide (6 wt. %). The recovered matter was further formed into pellets (diameter: 6 mm, height: 6 mm). The pellets were milled, and, after having passed 12-mesh to 28-mesh sieves, the product was employed as a cleaning agent G'. The BET specific surface area of the cleaning agent G' was found to be 172 $m^2/g$.

Cleaning Harmful Gas Containing Silane by Use of Regenerated Cleaning Agent

In a manner similar to that employed in the cleaning of a harmful gas by means of the cleaning agent G, the cleaning agent G' was charged into a cleaning column (inside diameter: 40 mm) made of hard glass such that the pack length was adjusted to 100 mm. Into this cleaning column, a dry-nitrogen-based gas containing silane (10,000 ppm) as a harmful component was caused to pass at a flow rate of 2,000 ml/min (superficial velocity: 2.65 cm/sec) at a temperature of 20° C. under atmospheric pressure, to thereby perform a cleaning test. The measurement results in terms of cleaning performance of the cleaning agent G' are shown in Table 1.

EXAMPLE 8

Preparation of Cleaning Agent Containing Copper Oxide and Manganese Oxide

Commercial copper sulfate pentahydrate (0.5 kg) and manganese sulfate heptahydrate (1.41 kg) were dissolved in ion-exchange water (5 L). To the resultant solution, a 15 wt. % aqueous solution (4.3 kg) of sodium carbonate was added, to thereby cause a copper component and a manganese component to precipitate. The resultant precipitate was filtered, washed with water, and kneaded with potassium hydroxide (46 g) and silver oxide (13 g) by means of a kneader. The resultant mixture was dried at 120° C., to thereby prepare a cleaning agent raw material comprising cupric oxide (24 wt. %), manganese dioxide (67 wt. %), potassium hydroxide (7 wt. %), and silver oxide (2 wt. %). The thus-prepared raw material was formed into pellets (diameter: 6 mm, height: 6 mm). The pellets were milled, and, after having passed 12-mesh to 28-mesh sieves, the product was employed as a cleaning agent H. The BET specific surface area of the cleaning agent H was found to be 142 $m^2/g$.

Cleaning Harmful Gas Containing Disilane

The procedure of Example 7 was repeated, except that a gas containing disilane (10,000 ppm) was used instead of a gas containing silane (10,000 ppm) and that the cleaning agent H was used instead of the cleaning agent G employed in "Cleaning Harmful Gas Containing Silane" of Example 7, to thereby clean a harmful gas containing disilane. The measurement results in terms of cleaning performance of the cleaning agent H are shown in Table 1.

Recovery of Copper Component and Manganese Component from Cleaning Agent

The cleaning agent H, having been used in a manner similar to that employed in the aforementioned cleaning of a harmful gas containing disilane, was collected in an amount of 500 g, and the collected cleaning agent was immersed in a mixture containing a 10 wt. % aqueous nitric acid solution (7.2 kg) and a 30 wt. % aqueous hydrogen peroxide solution (0.2 kg). Insoluble components were removed from the mixture solution through filtration, and a 15 wt. % aqueous solution (4 kg) of sodium carbonate serving as a precipitant for copper and manganese was added to the filtrate, to thereby cause a copper component and a manganese component to precipitate. The obtained precipitate was filtered, washed with water, and kneaded with potassium hydroxide (28 g) by means of a kneader. The resultant mixture was dried at 120° C., to thereby recover the copper component and the manganese component in the form of cupric oxide and manganese dioxide, respectively. The thus-recovered matter was found to comprise cupric oxide (24 wt. %), manganese dioxide (67 wt. %), potassium hydroxide (7 wt. %), and silver oxide (2 wt. %). The recovered matter was further formed into pellets (diameter: 6 mm, height: 6 mm). The pellets were milled, and, after having passed 12-mesh to 28-mesh sieves, the milled product was employed as a cleaning agent H'. The BET specific surface area of the cleaning agent H' was found to be 145 $m^2/g$ Cleaning Harmful Gas Containing Disilane by Use of Regenerated Cleaning Agent The procedure of Example 7 was repeated, except that a gas containing disilane (10,000 ppm) was used instead of a gas containing silane (10,000 ppm) and that the cleaning agent H' was used instead of the cleaning agent G' employed in "Cleaning Harmful Gas Containing Silane by Use of Regenerated Cleaning Agent" of Example 7, to thereby perform a cleaning test for a harmful gas containing disilane. The measurement results in terms of cleaning performance of the cleaning agent H' are shown in Table 1.

EXAMPLE 9

Preparation of Cleaning Agent Containing Copper Oxide and Manganese Oxide

Commercial copper sulfate pentahydrate (0.5 kg) and manganese sulfate heptahydrate (1.47 kg) were dissolved in ion-exchange water (5 L). To the resultant solution, a 15 wt. % aqueous solution (4.3 kg) of sodium carbonate was added, to thereby cause a copper component and a manganese component to precipitate. The resultant precipitate was filtered, washed with water, and kneaded with potassium hydroxide (48 g) and cobalt oxide (21 g) by means of a kneader. The resultant mixture was dried at 120° C., to thereby prepare a cleaning agent raw material comprising cupric oxide (23 wt. %), manganese dioxide (67 wt. %), potassium hydroxide (7 wt. %), and cobalt oxide (3 wt. %). The thus-prepared raw material was formed into pellets (diameter: 6 mm, height: 6 mm). The pellets were milled, and, after having passed 12-mesh to 28-mesh sieves, the product was employed as a cleaning agent I. The BET specific surface area of the cleaning agent I was found to be 163 $m^2/g$.

Cleaning Harmful Gas Containing Dichlorosilane

The procedure of Example 7 was repeated, except that a gas containing dichlorosilane (10,000 ppm) was used instead of a gas containing silane (10,000 ppm) and that the cleaning agent I was used instead of the cleaning agent G employed in "Cleaning Harmful Gas Containing Silane" of Example 7, to thereby clean a harmful gas containing dichlorosilane. The measurement results in terms of cleaning performance of the cleaning agent I are shown in Table 1.

Recovery of Copper Component and Manganese Component from Cleaning Agent

The cleaning agent I, having been used in a manner similar to that employed in the aforementioned cleaning of a harmful gas containing dichlorosilane, was collected in an amount of 500 g, and the collected cleaning agent was immersed in a mixture containing a 10 wt. % aqueous sulfuric acid solution (5.6 kg) and a 30 wt. % aqueous hydrogen peroxide solution (0.2 kg). Insoluble components were removed from the mixture solution through filtration, and a 15 wt. % aqueous solution (4 kg) of sodium carbonate serving as a precipitant for copper and manganese was added to the filtrate, to thereby cause a copper component and a manganese component to precipitate. The obtained precipitate was filtered, washed with water, and kneaded with potassium hydroxide (28 g) by means of a kneader. The resultant mixture was dried at 120° C., to thereby recover the copper component and the manganese component in the form of cupric oxide and manganese dioxide, respectively. The thus-recovered matter was found to comprise cupric oxide (23 wt. %), manganese dioxide (67 wt. %), potassium hydroxide (7 wt. %), and cobalt oxide (3 wt. %). The recovered matter was further formed into pellets (diameter: 6 mm, height: 6 mm). The pellets were milled, and, after having passed 12-mesh to 28-mesh sieves, the product was employed as a cleaning agent I'. The BET specific surface area of the cleaning agent I' was found to be 145 m²/g.
Cleaning Harmful Gas Containing Dichlorosilane by Use of Regenerated Cleaning Agent The procedure of Example 7 was repeated, except that a gas containing dichlorosilane (10,000 ppm) was used instead of a gas containing silane (10,000 ppm) and that the cleaning agent I' was used instead of the cleaning agent G' employed in "Cleaning Harmful Gas Containing Silane by Use of Regenerated Cleaning Agent " of Example 7, to thereby perform a cleaning test for a harmful gas containing dichlorosilane. The measurement results in terms of cleaning performance of the cleaning agent I' are shown in Table 1.

amount of 500 g, and the collected cleaning agent was immersed in a 10 wt. % aqueous sulfuric acid solution (6.0 kg) for dissolution. Insoluble components were removed from the acid solution through filtration, and a 15 wt. % aqueous solution (4.3 kg) of sodium carbonate serving as a precipitant for copper was added to the filtrate, to thereby cause a copper component to precipitate. The resultant precipitate was filtered, washed with water, and dried at 120° C., to thereby recover the copper component in the form of basic copper carbonate. The thus-recovered basic copper carbonate was further formed into pellets (diameter: 6 mm, height: 6 mm). The pellets were milled, and, after having passed 12-mesh to 28-mesh sieves, the milled product was employed as a cleaning agent b. The BET specific surface

TABLE 1

| | Harmful component | Cleaning agent components predominant/ additive | Precipitant for P or Si | Precipitant for Cu and Mn | Cleaning performance (frist use) | Cleaning performance (regenerated) |
|---|---|---|---|---|---|---|
| Ex. 1 | phosphine | CuO/Al$_2$O$_3$ | — | Na$_2$CO$_3$ | 116 | 110 |
| Ex. 2 | phosphine | CuO/ZrO$_2$ | — | Na$_2$CO$_3$ | 112 | 118 |
| Ex. 3 | t-butyl phosphine | CuO/ZnO | — | NaOH | 16 | 17 |
| Ex. 4 | phosphine | CuO/SiO$_2$ | MgSO$_4$ | Na$_2$CO$_3$ | 118 | 125 |
| Ex. 5 | phosphine | CuO, MnO$_2$/Al$_2$O$_3$ | — | Na$_2$CO$_3$ | 40 | 42 |
| Ex. 6 | phosphine | CuO, MnO$_2$/Al$_2$O$_3$ | MgSO$_4$ | Na$_2$CO$_3$ | 43 | 40 |
| Ex. 7 | silane | CuO, MnO$_2$/Al$_2$O$_3$ | — | Na$_2$CO$_3$ | 21 | 20 |
| Ex. 8 | disilane | CuO, MnO$_2$/KOH, Ag$_2$O | — | Na$_2$CO$_3$ | 15 | 16 |
| Ex. 9 | dichloro-silane | CuO, MnO$_2$/KOH, CoO | — | Na$_2$CO$_3$ | 45 | 44 |

EXAMPLE 10
Preparation of Cleaning Agent Containing Basic Copper Carbonate

Commercial copper sulfate pentahydrate (1.5 kg) was dissolved in ion-exchange water (5 L). To the resultant solution, a 15 wt. % aqueous solution (4.3 kg) of sodium carbonate was added, to thereby cause a copper component to precipitate. The resultant precipitate was filtered, washed with water, and dried at 120° C., to thereby prepare basic copper carbonate. The thus-prepared basic copper carbonate was formed into pellets (diameter: 6 mm, height: 6 mm). The pellets were milled, and, after having passed 12-mesh to 28-mesh sieves, the milled product was employed as a cleaning agent a. The BET specific surface area of basic copper carbonate (cleaning agent a), as measured by means of a gas adsorption amount measurement apparatus (Autosorb 3B, product of Yuasa Ionics), was 66 m²/g.
Cleaning Harmful Gas Containing Phosphine The cleaning agent a was charged into a cleaning column (inside diameter: 40 mm) made of hard glass such that the pack length was adjusted to 100 mm. Into this cleaning column, a dry-nitrogen-based gas containing phosphine (10,000 ppm) as a harmful component was caused to pass at 20° C. under atmospheric pressure at a flow rate of 2,000 ml/min (superficial velocity: 2.65 cm/sec). During passage of the gas, a portion of the gas flown from the outlet of the cleaning column was aspirated into a detection tube (Phosphine 7L, product of Gastech, detection limit: 0.15 ppm), and the time elapsed until detection of phosphine (effective treatment time) was measured, to thereby obtain the amount (L) of phosphine removed per liter (L) of a cleaning agent (cleaning performance). The results are shown in Table 2.
Recovery of Copper Component from Cleaning Agent The cleaning agent a, having been used in a manner similar to that employed in the aforementioned "Cleaning Harmful Gas Containing Phosphine," was collected in an area of the recovered basic copper carbonate (cleaning agent b) was found to be 64 m²/g.
Cleaning Harmful Gas Containing Phosphine by Use of Regenerated Cleaning Agent In a manner similar to that employed in the aforementioned "Cleaning Harmful Gas Containing Phosphine," the cleaning agent b was charged into a cleaning column (inside diameter: 40 mm) made of hard glass such that the pack length was adjusted to 100 mm. Into this cleaning column, a dry-nitrogen-based gas containing phosphine (10,000 ppm) as a harmful component was caused to pass at 20° C. under atmospheric pressure at a flow rate of 2,000 ml/min (superficial velocity: 2.65 cm/sec), to thereby perform a cleaning test. The measurement results in terms of cleaning performance of the cleaning agent b are shown in Table 2.

EXAMPLE 11
Recovery of Copper Component from Cleaning Agent

The cleaning agent a, having been used in a manner similar to that employed in the "Cleaning Harmful Gas Containing Phosphine" of Example 10, was collected in an amount of 500 g, and the collected cleaning agent was immersed in a 10 wt. % aqueous sulfuric acid solution (6.0 kg) for dissolution. Insoluble components were removed from the acid solution through filtration, and a 4.1 wt. % aqueous solution (6.0 kg) of sodium hydroxide serving as a precipitant for copper was added to the filtrate, to thereby cause a copper component to precipitate. The resultant precipitate was filtered, washed with water, and dried at 120° C., to thereby recover the copper component in the form of copper hydroxide. The thus-recovered copper hydroxide was further formed into pellets (diameter: 6 mm, height: 6 mm). The pellets were milled, and, after having passed 12-mesh to 28-mesh sieves, the product was employed as a cleaning agent c. The BET specific surface area of the recovered copper hydroxide (cleaning agent c) was found to be 40 m²/g.

Cleaning Harmful Gas Containing Phosphine by Use of Regenerated Cleaning Agent

In a manner similar to that employed in the "Cleaning Harmful Gas Containing Phosphine by Use of Regenerated Cleaning Agent" of Example 10, the cleaning agent c was charged into a cleaning column (inside diameter: 40 mm) made of hard glass such that the pack length was adjusted to 100 mm. Into this cleaning column, a dry-nitrogen-based gas containing phosphine (10,000 ppm) as a harmful component was caused to pass at 20° C. under atmospheric pressure at a flow rate of 2,000 ml/min (superficial velocity: 2.65 cm/sec), to thereby perform a cleaning test. The measurement results in terms of cleaning performance of the cleaning agent c are shown in Table 2.

EXAMPLE 12

Recovery of Copper Component from Cleaning Agent

The cleaning agent a, having been used in a manner similar to that employed in the "Cleaning Harmful Gas Containing Phosphine" of Example 10, was collected in an amount of 500 g, and the collected cleaning agent was immersed in a 10 wt. % aqueous sulfuric acid solution (6.0 kg) for dissolution. Insoluble components were removed from the acid solution through filtration, and a 15 wt. % aqueous solution (4.3 kg) of sodium carbonate serving as a precipitant for copper was added to the filtrate, to thereby cause a copper component to precipitate. The resultant precipitate was filtered, washed with water, and kneaded with aluminum oxide (16 g) by means of a kneader. The resultant mixture was dried at 120° C. and calcined at 350° C., to thereby recover the copper component in the form of cupric oxide. The thus-recovered matter was found to comprise cupric oxide (96 wt. %) and aluminum oxide (4 wt. %). The recovered matter was further formed into pellets (diameter: 6 mm, height: 6 mm). The pellets were milled, and, after having passed 12-mesh to 28-mesh sieves, the product was employed as a cleaning agent d. The BET specific surface area of the cleaning agent d was found to be 83 $m^2/g$.

Cleaning Harmful Gas Containing Phosphine by Use of Regenerated Cleaning Agent

In a manner similar to that employed in the "Cleaning Harmful Gas Containing Phosphine by Use of Regenerated Cleaning Agent" of Example 10, the cleaning agent d was charged into a cleaning column (inside diameter: 40 mm) made of hard glass such that the pack length was adjusted to 100 mm. Into this cleaning column, a dry-nitrogen-based gas containing phosphine (10,000 ppm) as a harmful component was caused to pass at 20° C. under atmospheric pressure at a flow rate of 2,000 ml/min (superficial velocity: 2.65 cm/sec), to thereby perform a cleaning test. The measurement results in terms of cleaning performance of the cleaning agent d are shown in Table 2.

EXAMPLE 13

Cleaning Harmful Gas Containing t-Butylphosphine

The cleaning agent a which had been prepared in a manner similar to that of Example 10 was charged into a cleaning column (inside diameter: 40 mm) made of hard glass such that the pack length was adjusted to 100 mm. Into this cleaning column, a dry-nitrogen-based gas containing t-butylphosphine (10,000 ppm) as a harmful component was caused to pass at a flow rate of 2,000 ml/min (superficial velocity: 2.65 cm/sec) at a temperature of 20° C. under atmospheric pressure. During passage of the gas, a portion of the gas flown from the outlet of the cleaning column was aspirated into a detection tube (Phosphine 7 L, product of Gastech, detection limit: 0.15 ppm), and the time elapsed until detection of t-butylphosphine (effective treatment time) was measured, to thereby obtain the amount (L) of t-butylphosphine removed per liter (L) of a cleaning agent (cleaning performance). The results are shown in Table 2.

Recovery of Copper Component from Cleaning Agent

The cleaning agent a, having been used in a manner similar to that employed in the aforementioned "Cleaning Harmful Gas Containing t-Butylphosphine" was collected in an amount of 500 g, and the collected cleaning agent was immersed in a 10 wt. % aqueous sulfuric acid solution (6.0 kg) for dissolution. Insoluble components were removed from the acid solution through filtration, and a 15 wt. % aqueous solution (4.3 kg) of sodium carbonate serving as a precipitant for copper was added to the filtrate, to thereby cause a copper component to precipitate. The resultant precipitate was filtered, washed with water, and dried at 120° C., to thereby recover the copper component in the form of basic copper carbonate. The thus-recovered basic copper carbonate was further formed into pellets (diameter: 6 mm, height: 6 mm). The pellets were milled, and, after having passed 12-mesh to 28-mesh sieves, the milled product was employed as a cleaning agent e. The BET specific surface area of the recovered basic copper carbonate (cleaning agent e) was found to be 62 $m^2/g$.

Cleaning Harmful Gas Containing t-Butylohosphine by Use of Regenerated Cleaning Agent In a manner similar to that employed in the aforementioned "Cleaning Harmful Gas Containing t-Butylphosphine" the cleaning agent e was charged into a cleaning column (inside diameter: 40 mm) made of hard glass such that the pack length was adjusted to 100 mm. Into this cleaning column, a dry-nitrogen-based gas containing t-butylphosphine (10,000 ppm) as a harmful component was caused to pass at a flow rate of 2,000 ml/min (superficial velocity: 2.65 cm/sec) at a temperature of 20° C. under atmospheric pressure, to thereby perform a cleaning test. The measurement results in terms of cleaning performance of the cleaning agent e are shown in Table 2.

EXAMPLE 14

Recovery of Copper Component from Cleaning Agent

The cleaning agent a, having been used in a manner similar to that employed in the "Cleaning Harmful Gas Containing Phosphine" of Example 10, was collected in an amount of 500 g, and the collected cleaning agent was immersed in a 10 wt. % aqueous sulfuric acid solution (6.0 kg) for dissolution. Subsequently, a 15 wt. % aqueous solution (1.5 kg) of magnesium sulfate serving as a precipitant for phosphorus was added to the resultant solution, to thereby cause a phosphorus component to precipitate. The resultant precipitate was removed through filtration, and a 15 wt. % aqueous solution (4.3 kg) of sodium carbonate serving as a precipitant for copper was added to the filtrate, to thereby cause a copper component to precipitate. The resultant precipitate was filtered, washed with water, and dried at 120° C., to thereby recover the copper component in the form of basic copper carbonate. The thus-recovered basic copper carbonate was further formed into pellets (diameter: 6 mm, height: 6 mm). The pellets were milled, and, after having passed 12-mesh to 28-mesh sieves, the milled product was employed as a cleaning agent f. The BET specific surface area of the recovered basic copper carbonate (cleaning agent f) was found to be 64 $m^2/mg$.

Cleaning Harmful Gas Containing Phosphine by Use of Regenerated Cleaning Agent

In a manner similar to that employed in the "Cleaning Harmful Gas Containing Phosphine by Use of Regenerated Cleaning Agent" of Example 10, the cleaning agent f was charged into a cleaning column (inside diameter: 40 mm) made of hard glass such that the pack length was adjusted to 100 mm. Into this cleaning column, a dry-nitrogen-based gas containing phosphine (10,000 ppm) as a harmful component was caused to pass at a flow rate of 2,000 ml/min (superficial velocity: 2.65 cm/sec) at a temperature of 20° C. under atmospheric pressure, to thereby perform a cleaning test. The measurement results in terms of cleaning performance of the cleaning agent f are shown in Table 2.

EXAMPLE 15
Preparation of Cleaning Agent Containing Copper Hydroxide

Commercial copper sulfate pentahydrate (1.5 kg) was dissolved in ion-exchange water (5 L). To the resultant solution, a 16 wt. % aqueous solution (1.5 kg) of sodium hydroxide was added, to thereby cause a copper component to precipitate. The resultant precipitate was filtered, washed with water, and dried at 120° C., to thereby prepare copper hydroxide. The thus-prepared copper hydroxide was formed into pellets (diameter: 6 mm, height: 6 mm). The pellets were milled, and, after having passed 12-mesh to 28-mesh sieves, the product was employed as a cleaning agent g. The BET specific surface area of copper hydroxide (cleaning agent g), as measured by means of a gas adsorption amount measurement apparatus, was 41 $m^2/g$.

Cleaning Harmful Gas Containing Phosphine

The cleaning agent g was charged into a cleaning column (inside diameter: 40 mm) made of hard glass such that the pack length was adjusted to 100 mm. Into this cleaning column, a dry-nitrogen-based gas containing phosphine (10,000 ppm) as a harmful component was caused to pass at 20° C. under atmospheric pressure at a flow rate of 2,000 ml/min (superficial velocity: 2.65 cm/sec). During passage of the gas, a portion of the gas flown from the outlet of the cleaning column was aspirated into a detection tube (Phosphine 7 L, product of Gastech, detection limit: 0.15 ppm), and the time elapsed until detection of phosphine (effective treatment time) was measured, to thereby obtain the amount (L) of phosphine removed per liter (L) of a cleaning agent (cleaning performance). The results are shown in Table 2.

Recovery of Copper Component from Cleaning Agent

The cleaning agent g, having been used in a manner similar to that employed in the aforementioned "Cleaning Harmful Gas Containing Phosphine," was collected in an amount of 500 g, and the collected cleaning agent was immersed in a 10 wt. % aqueous sulfuric acid solution (6.0 kg) for dissolution. Insoluble components were removed from the acid solution through filtration, and a 4.1 wt. % aqueous solution (6.0 kg) of sodium hydroxide serving as a precipitant for copper was added to the filtrate, to thereby cause a copper component to precipitate. The resultant precipitate was filtered, washed with water, and dried at 120° C., to thereby recover the copper component in the form of copper hydroxide. The thus-recovered copper hydroxide was further formed into pellets (diameter: 6 mm, height: 6 mm). The pellets were milled, and, after having passed 12-mesh to 28-mesh sieves, the milled product was employed as a cleaning agent h. The BET specific surface area of the recovered copper hydroxide (cleaning agent h) was found to be 42 $m^2/g$.

Cleaning Harmful Gas Containing Phosphine by Use of Regenerated Cleaning Agent

In a manner similar to that employed in the aforementioned "Cleaning Harmful Gas Containing Phosphine," the cleaning agent h was charged into a cleaning column (inside diameter: 40 mm) made of hard glass such that the pack length was adjusted to 100 mm. Into this cleaning column, a dry-nitrogen-based gas containing phosphine (10,000 ppm) as a harmful component was caused to pass at a flow rate of 2,000 ml/min (superficial velocity: 2.65 cm/sec) at a temperature of 20° C. under atmospheric pressure, to thereby perform a cleaning test. The measurement results in terms of cleaning performance of the cleaning agent h are shown in Table 2.

EXAMPLE 16
Recovery of Cooler Component from Cleaning Agent

The cleaning agent g, having been used in a manner similar to that employed in the "Cleaning Harmful Gas Containing Phosphine" of Example 15, was collected in an amount of 500 g, and the collected cleaning agent was immersed in a 10 wt. % aqueous sulfuric acid solution (6.0 kg) for dissolution. Subsequently, a 15 wt. % aqueous solution (1.5 kg) of magnesium sulfate serving as a precipitant for phosphorus was added to the resultant solution, to thereby cause a phosphorus component to precipitate. The resultant precipitate was removed from the acid solution through filtration, and a 5.3 wt. % aqueous solution (6.0 kg) of sodium hydroxide serving as a precipitant for copper was added to the filtrate, to thereby cause a copper component to precipitate. The resultant precipitate was filtered, washed with water, and dried at 120° C., to thereby recover the copper component in the form of copper hydroxide. The thus-recovered copper hydroxide was further formed into pellets (diameter: 6 mm, height: 6 mm). The pellets were milled, and, after having passed 12-mesh to 28-mesh sieves, the product was employed as a cleaning agent i. The BET specific surface area of the recovered copper hydroxide (cleaning agent i) was found to be 38 $m^2/g$.

Cleaning Harmful Gas Containing Phosphine by Use of Regenerated Cleaning Agent

In a manner similar to that employed in the "Cleaning Harmful Gas Containing Phosphine by Use of Regenerated Cleaning Agent" of Example 15, the cleaning agent i was charged into a cleaning column (inside diameter: 40 mm) made of hard glass such that the pack length was adjusted to 100 mm. Into this cleaning column, a dry-nitrogen-based gas containing phosphine (10,000 ppm) as a harmful component was caused to pass at 20° C. under atmospheric pressure at a flow rate of 2,000 ml/min (superficial velocity: 2.65 cm/sec), to thereby perform a cleaning test. The measurement results in terms of cleaning performance of the cleaning agent i are shown in Table 2.

EXAMPLE 17
Cleaning Harmful Gas Containing Silane

The cleaning agent a which had been prepared in a manner similar to that of Example 10 was charged into a cleaning column (inside diameter: 40 mm) made of hard glass such that the pack length was adjusted to 100 mm. Into this cleaning column, a dry-nitrogen-based gas containing silane (10,000 ppm) as a harmful component was caused to pass at a flow rate of 2,000 ml/min (superficial velocity: 2.65 cm/sec) at a temperature of 20° C. under atmospheric pressure. During passage of the gas, a portion of the gas flown from the outlet of the cleaning column was aspirated into a detection tube (Silane S, product of Komyo Rikagaku Kogyo, detection limit: 0.5 ppm), and the time elapsed until detection of silane (effective treatment time) was measured, to thereby obtain the amount (L) of silane removed per liter (L) of a cleaning agent (cleaning performance). The results are shown in Table 2.

Recovery of Copper Component from Cleaning Agent

The cleaning agent a, having been used in a manner similar to that employed in the aforementioned "Cleaning Harmful Gas Containing Silane," was collected in an amount of 500 g, and the collected cleaning agent was immersed in a mixture containing a 10 wt. % aqueous sulfuric acid solution (5.6 kg) and a 30 wt. % aqueous hydrogen peroxide solution (0.2 kg). Insoluble components were removed from the mixture solution through filtration, and a 15 wt. % aqueous solution (4.3 kg) of sodium carbonate serving as a precipitant for copper was added to the filtrate, to thereby cause a copper component to precipitate. The obtained precipitate was filtered, washed with water, dried at 120° C., to thereby recover the copper component in the form of basic copper carbonate. The thus-recovered basic copper carbonate was further formed into pellets (diameter: 6 mm, height: 6 mm). The pellets were milled, and, after having passed 12-mesh to 28-mesh sieves, the product was employed as a cleaning agent j. The BET specific surface area of the recovered basic copper carbonate (cleaning agent j) was found to be 61 $m^2/g$.

Cleaning Harmful Gas Containing Silane by Use of Regenerated Cleaning Agent

In a manner similar to that employed in the aforementioned "Cleaning Harmful Gas Containing Silane," the cleaning agent j was charged into a cleaning column (inside diameter: 40 mm) made of hard glass such that the pack length was adjusted to 100 mm. Into this cleaning column, a dry-nitrogen-based gas containing silane (10,000 ppm) as a harmful component was caused to pass at a flow rate of 2,000 ml/min (superficial velocity: 2.65 cm/sec) at a temperature of 20° C. under atmospheric pressure, to thereby perform a cleaning test. The measurement results in terms of cleaning performance of the cleaning agent j are shown in Table 2.

EXAMPLE 18

Recovery of Copper Component from Cleaning Agent

The cleaning agent a, having been used in a manner similar to that employed in the "Cleaning Harmful Gas Containing Silane" of Example 17, was collected in an amount of 500 g, and the collected cleaning agent was immersed in a mixture containing a 10 wt. % aqueous sulfuric acid solution (5.6 kg) and a 30 wt. % aqueous hydrogen peroxide solution (0.2 kg). Insoluble components were removed from the mixture solution through filtration, and a 4.1 wt. % aqueous solution (6.0 kg) of sodium hydroxide serving as a precipitant for copper was added to the filtrate, to thereby cause a copper component to precipitate. The obtained precipitate was filtered, washed with water, dried at 120° C., to thereby recover the copper component in the form of copper hydroxide. The thus-recovered copper hydroxide was further formed into pellets (diameter: 6 mm, height: 6 mm). The pellets were milled, and, after having passed 12-mesh to 28-mesh sieves, the milled product was employed as a cleaning agent k. The BET specific surface area of the recovered copper hydroxide (cleaning agent k) was found to be 39 $m^2/g$.

Cleaning Harmful Gas Containing Silane by Use of Regenerated Cleaning Agent

In a manner similar to that employed in the "Cleaning Harmful Gas Containing Silane by Use of Regenerated Cleaning agent" of Example 17, the cleaning agent k was charged into a cleaning column (inside diameter: 40 mm) made of hard glass such that the pack length was adjusted to 100 mm. Into this cleaning column, a dry-nitrogen-based gas containing silane (10,000 ppm) as a harmful component was caused to pass at 20° C. under atmospheric pressure at a flow rate of 2,000 ml/min (superficial velocity: 2.65 cm/sec), to thereby perform a cleaning test. The measurement results in terms of cleaning performance of the cleaning agent k are shown in Table 2.

EXAMPLE 19

Recovery of Copper Component from Cleaning Agent

The cleaning agent a, having been used in a manner similar to that employed in the "Cleaning Harmful Gas Containing Silane" of Example 17, was collected in an amount of 500 g, and the collected cleaning agent was immersed in a mixture containing a 10 wt. % aqueous sulfuric acid solution (5.6 kg) and a 30 wt. % aqueous hydrogen peroxide solution (0.2 kg). Insoluble components were removed from the mixture solution through filtration, and a 15 wt. % aqueous solution (4.3 kg) of sodium carbonate serving as a precipitant for copper was added to the filtrate, to thereby cause a copper component to precipitate. The resultant precipitate was filtered, washed with water, and kneaded with aluminum oxide (16 g) by means of a kneader. The resultant mixture was dried at 120° C. and calcined at 350° C., to thereby recover the copper component in the form of cupric oxide. The thus-recovered matter was found to comprise cupric oxide (96 wt. %) and aluminum oxide (4 wt. %). The recovered matter was further formed into pellets (diameter: 6 mm, height: 6 mm). The pellets were milled, and, after having passed 12-mesh to 28-mesh sieves, the milled product was employed as a cleaning agent l. The BET specific surface area of the cleaning agent l was found to be 81 $m^2/g$.

Cleaning Harmful Gas Containing Silane by Use of Regenerated Cleaning Agent

In a manner similar to that employed in the "Cleaning Harmful Gas Containing Silane by Use of Regenerated Cleaning Agent" of Example 17, the cleaning agent l was charged into a cleaning column (inside diameter: 40 mm) made of hard glass such that the pack length was adjusted to 100 mm. Into this cleaning column, a dry-nitrogen-based gas containing silane (10,000 ppm) as a harmful component was caused to pass at a flow rate of 2,000 ml/min (superficial velocity: 2.65 cm/sec) at a temperature of 20° C. under atmospheric pressure, to thereby perform a cleaning test. The measurement results in terms of cleaning performance of the cleaning agent l are shown in Table 2.

EXAMPLE 20

Cleaning Harmful Gas Containing Disilane

The cleaning agent a which had been prepared in a manner similar to that of Example 10 was charged into a cleaning column (inside diameter: 40 mm) made of hard glass such that the pack length was adjusted to 100 mm. Into this cleaning column, a dry-nitrogen-based gas containing disilane (10,000 ppm) as a harmful component was caused to pass at a flow rate of 2,000 ml/min (superficial velocity: 2.65 cm/sec) at a temperature of 20° C. under atmospheric pressure. During passage of the gas, a portion of the gas flown from the outlet of the cleaning column was aspirated into a detection tube (Silane S, product of Komyo Rikagaku Kogyo, detection limit: 0.5 ppm), and the time elapsed until detection of disilane (effective treatment time) was measured, to thereby obtain the amount (L) of disilane removed per liter (L) of a cleaning agent (cleaning performance). The results are shown in Table 2.

Recovery of Copper Component from Cleaning Agent

The cleaning agent a, having been used in a manner similar to that employed in the aforementioned "Cleaning Harmful Gas Containing Disilane," was collected in an amount of 500 g, and the collected cleaning agent was immersed in a mixture containing a 10 wt. % aqueous sulfuric acid solution (5.6 kg) and a 30 wt. % aqueous hydrogen peroxide solution (0.2 kg). Insoluble components were removed from the mixture solution through filtration, and a 15 wt. % aqueous solution (4.3 kg) of sodium carbonate serving as a precipitant for copper was added to the filtrate, to thereby cause a copper component to precipitate. The obtained precipitate was filtered, washed with water, dried at 120° C., to thereby recover the copper component in the form of basic copper carbonate. The thus-recovered basic copper carbonate was further formed into pellets (diameter: 6 mm, height: 6 mm). The pellets were milled, and and, after having passed 12-mesh to 28-mesh sieves, the product was employed as a cleaning agent m. The BET specific surface area of the recovered basic copper carbonate (cleaning agent m) was found to be 63 $m^2/g$.

Cleaning Harmful Gas Containing Diilane by Use of Regenerated Cleaning Agent

In a manner similar to that employed in the aforementioned "Cleaning Harmful Gas Containing Disilane," the cleaning agent m was charged into a cleaning column (inside diameter: 40 mm) made of hard glass such that the pack length was adjusted to 100 mm. Into this cleaning column, a dry-nitrogen-based gas containing disilane (10,000 ppm) as a harmful component was caused to pass at a flow rate of 2,000 ml/min (superficial velocity: 2.65 cm/sec) at a temperature of 20° C. under atmospheric pressure, to thereby perform a cleaning test. The measurement results in terms of cleaning performance of the cleaning agent m are shown in Table 2.

EXAMPLE 21

Cleaning Harmful Gas Containing Dichlorosilane

The cleaning agent g which had been prepared in a manner similar to that of Example 15 was charged into a cleaning column (inside diameter: 40 mm) made of hard glass such that the pack length was adjusted to 100 mm. Into this cleaning column, a dry-nitrogen-based gas containing dichlorosilane (10,000 ppm) as a harmful component was caused to pass at a flow rate of 2,000 ml/min (superficial velocity: 2.65 cm/sec) at a temperature of 20° C. under atmospheric pressure. During passage of the gas, a portion of the gas flown from the outlet of the cleaning column was aspirated into a detection tube (product of Gastech, detection limit: 0.05 ppm), and the time elapsed until detection of dichlorosilane (effective treatment time) was measured, to thereby obtain the amount (L) of dichlorosilane removed per liter (L) of a cleaning agent (cleaning performance). The results are shown in Table 2.

Recovery of Copper Component from Cleaning Agent

The cleaning agent g, having been used in a manner similar to that employed in the aforementioned "Cleaning Harmful Gas Containing Dichlorosilane," was collected in an amount of 500 g, and the collected cleaning agent was immersed in a mixture containing a 10 wt. % aqueous sulfuric acid solution (5.6 kg) and a 30 wt. % aqueous hydrogen peroxide solution (0.2 kg). Insoluble components were removed from the mixture solution through filtration, and a 4.1 wt. % aqueous solution (6.0 kg) of sodium hydroxide serving as a precipitant for copper was added to the filtrate, to thereby cause a copper component to precipitate. The obtained precipitate was filtered, washed with water, dried at 120° C., to thereby recover the copper component in the form of copper hydroxide. The thus-recovered copper hydroxide was further formed into pellets (diameter: 6 mm, height: 6 mm). The pellets were milled, and, after having passed 12-mesh to 28-mesh sieves, the product was employed as a cleaning agent n. The BET specific surface area of the recovered copper hydroxide (cleaning agent n) was found to be 41 $m^2/g$.

Cleaning Harmful Gas Containing Dichlorosilane by Use of Regenerated Cleaning Agent In a manner similar to that employed in the aforementioned "Cleaning Harmful Gas Containing Dichlorosilane," the cleaning agent n was charged into a cleaning column (inside diameter: 40 mm) made of hard glass such that the pack length was adjusted to 100 mm. Into this cleaning column, a dry-nitrogen-based gas containing dichlorosilane (10,000 ppm) as a harmful component was caused to pass at 20° C. under atmospheric pressure at a flow rate of 2,000 ml/min (superficial velocity: 2.65 cm/sec), to thereby perform a cleaning test. The measurement results in terms of cleaning performance of the cleaning agent n are shown in Table 2.

TABLE 2-1

|  | Harmful component | Cleaning agent copper component | Precipit-ant for P | Precipit-ant for Cu | Recovered cleaning agent components | Cleaning performance (first use) | Cleaning performance (regenerated) |
|---|---|---|---|---|---|---|---|
| Ex. 10 | phosphine | basic copper carbonate | — | $Na_2CO_3$ | basic copper carbonate | 72 | 71 |
| Ex. 11 | phosphine | basic copper carbonate | — | NaOH | copper hydroxide | 72 | 65 |
| Ex. 12 | phosphine | basic copper carbonate | — | $Na_2CO_3$ | copper oxide, alumina | 72 | 100 |
| Ex. 13 | t-butyl-phosphine | basic copper carbonate | — | $Na_2CO_3$ | basic copper carbonate | 11 | 11 |
| Ex. 14 | phosphine | basic copper carbonate | $MgSO_4$ | $Na_2CO_3$ | basic copper carbonate | 72 | 70 |
| Ex. 15 | phosphine | copper hydroxide | — | NaOH | copper hydroxide | 66 | 65 |

*Cleaning performance: based on the amount of removed harmful component per liter (L) of the cleaning agent.

TABLE 2-2

|  | Harmful component | Cleaning agent copper component | Precipit-ant for P | Precipit-ant for Cu | Recovered cleaning agent components | Cleaning performance (first use) | Cleaning performance (regenerated) |
|---|---|---|---|---|---|---|---|
| Ex. 16 | phosphine | copper hydroxide | $MgSO_4$ | NaOH | copper hydroxide | 66 | 66 |
| Ex. 17 | silane | basic copper carbonate | — | $Na_2CO_3$ | basic copper carbonate | 15 | 15 |

TABLE 2-2-continued

|  | Harmful component | Cleaning agent copper component | Precipit-ant for P | Precipit-ant for Cu | Recovered cleaning agent components | Cleaning performance (first use) | Cleaning performance (regenerated) |
|---|---|---|---|---|---|---|---|
| Ex. 18 | silane | basic copper carbonate | — | NaOH | copper hydroxide | 15 | 12 |
| Ex. 19 | silane | basic copper carbonate | — | $Na_2CO_3$ | copper oxide, alumina | 15 | 19 |
| Ex. 20 | disilane | basic copper carbonate | — | $Na_2CO_3$ | basic copper carbonate | 11 | 12 |
| Ex. 21 | dichloro-silane | copper hydroxide | — | NaOH | copper hydroxide | 32 | 31 |

*Cleaning performance: based on the amount of removed harmful component per liter (L) of the cleaning agent.

As described hereinabove, a copper component can be recovered from a cleaning agent which has been used for cleaning a harmful gas containing as a harmful component a phosphine or a silane gas. A cleaning agent regenerated from the recovered copper component has been confirmed to exhibit cleaning performance as high as a fresh cleaning agent which has not been used for cleaning a harmful gas.

What is claimed is:

1. A method of recovering a cleaning agent, the cleaning agent having been used for removing, through contact with a harmful gas, a phosphine contained as a harmful component in the harmful gas, and being at least one species selected from among a cleaning agent containing copper oxide as a component thereof, a cleaning agent containing basic copper carbonate as a component thereof, and a cleaning agent containing copper hydroxide as a component thereof, the method comprising:

immersing the cleaning agent in an acidic solution, to thereby dissolve the cleaning agent;

adding to the resultant solution a precipitant for copper, to thereby cause a copper compound component to precipitate;

separating the copper compound component from a phosphorus component which has been sorbed in the cleaning agent during the course of cleaning the harmful gas; and recovering the copper compound component of the cleaning agent.

2. A method of recovering a cleaning agent according to claim 1, wherein the cleaning agent containing copper oxide as a component thereof further contains, before use of the agent, at least one species selected from a metal and a metal oxide other than copper oxide.

3. A method of recovering a cleaning agent according to claim 1, wherein, after formation of precipitate of the copper compound, the copper component contained in the precipitates is recovered in the form of copper oxide, basic copper carbonate, or copper hydroxide.

4. A method of recovering a cleaning agent according to claim 3, wherein the copper oxide, basic copper carbonate, or copper hydroxide which is to be recovered has a BET specific surface area of 10 $m^2/g$ or more.

5. A method of recovering a cleaning agent according to claim 1, wherein the precipitant for copper is at least one species selected from among lithium hydroxide, sodium hydroxide, potassium hydroxide, ammonium hydroxide, sodium carbonate, potassium carbonate, ammonium carbonate, sodium hydrogencarbonate, potassium hydrogencarbonate, and ammonium hydrogencarbonate.

6. A method of recovering a cleaning agent according to claim 1, wherein the cleaning agent containing basic copper carbonate as a component thereof further contains, before use of the agent, at least one species selected from a metal and a metal oxide.

7. A method of recovering a cleaning agent according to claim 1, wherein the cleaning agent containing copper hydroxide as a component thereof further contains, before use of the agent, at least one species selected from a metal and a metal oxide.

8. A method of recovering a cleaning agent according to claim 1, wherein the cleaning agent containing basic copper carbonate as a component thereof has, before use of the agent, a BET specific surface area of 10 $m^2/g$ or more.

9. A method of recovering a cleaning agent according to claim 1, wherein the cleaning agent containing copper hydroxide as a component thereof has, before use of the agent, a BET specific surface area of 10 $m^2/g$ or more.

* * * * *